(12) United States Patent
Do Ba

(10) Patent No.: US 9,977,765 B2
(45) Date of Patent: May 22, 2018

(54) INFORMATION PROCESSING DEVICE, INFORMATION PROCESSING METHOD, INFORMATION PROCESSING PROGRAM, DISPLAY CONTROL DEVICE, AND DISPLAY CONTROL PROGRAM

(71) Applicant: Rakuten, Inc., Tokyo (JP)

(72) Inventor: Duc Do Ba, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 69 days.

(21) Appl. No.: 14/770,602

(22) PCT Filed: Feb. 28, 2013

(86) PCT No.: PCT/JP2013/055484
§ 371 (c)(1),
(2) Date: Aug. 26, 2015

(87) PCT Pub. No.: WO2014/132404
PCT Pub. Date: Sep. 4, 2014

(65) Prior Publication Data
US 2016/0012018 A1 Jan. 14, 2016

(51) Int. Cl.
*G06F 17/22* (2006.01)
*G06F 3/048* (2013.01)
(Continued)

(52) U.S. Cl.
CPC .......... *G06F 17/217* (2013.01); *G06F 3/0483* (2013.01); *G06F 3/0485* (2013.01);
(Continued)

(58) Field of Classification Search
CPC ............................................... G06F 17/30905
See application file for complete search history.

(56) References Cited

U.S. PATENT DOCUMENTS 8,793,573 B2 * 7/2014 Beckmann .......... G06F 17/3089
715/235
9,147,006 B2 * 9/2015 Brown .............. G06F 17/30899
(Continued)

FOREIGN PATENT DOCUMENTS

JP      2002-140353 A    5/2002
JP      2002-351802 A    12/2002
(Continued)

OTHER PUBLICATIONS

Communication from International Searching Authority dated Sep. 11, 2015 from Counterpart International Application PCT/JP2013/055484.
(Continued)

*Primary Examiner* — Scott Baderman
*Assistant Examiner* — Mario M Velez-Lopez
(74) *Attorney, Agent, or Firm* — Sughrue Mion, PLLC

(57) ABSTRACT

An information processing device according to one embodiment includes a receiving unit, a frame generation unit, an acquisition unit, an embedding unit and a transmitting unit. The receiving unit receives a request for a full size frame from a user terminal. The frame generation unit generates the full size frame having a size of a region occupied by a plurality of objects to be displayed on a plurality of pages arranged in a specified direction. The acquisition unit acquires, from an object storage unit, all initial display objects to be embedded in an initial display page. The embedding unit embeds the initial display objects in the full size frame. The transmitting unit transmits the full size frame in which the initial display objects are embedded to the user terminal.

18 Claims, 19 Drawing Sheets

(51) Int. Cl.
*G06F 17/21* (2006.01)
*H04L 12/64* (2006.01)
*G06F 3/0483* (2013.01)
*G06F 3/0485* (2013.01)

(52) U.S. Cl.
CPC ...... *G06F 3/04855* (2013.01); *G06F 17/2247* (2013.01); *H04L 12/6418* (2013.01)

(56) References Cited

U.S. PATENT DOCUMENTS

| | | | |
|---|---|---|---|
| 9,552,439 B1* | 1/2017 | Krecichwost | ..... G06F 17/30905 |
| 2003/0135538 A1 | 7/2003 | Takeuchi et al. | |
| 2005/0234875 A1* | 10/2005 | Auerbach | ......... G06F 17/30038 |
| 2006/0277271 A1* | 12/2006 | Morse | ................... H04L 67/306 |
| | | | 709/217 |
| 2007/0006067 A1 | 1/2007 | Kikuchi | |
| 2007/0028162 A1* | 2/2007 | Griffin | ............. G06F 17/3089 |
| | | | 715/235 |
| 2007/0186182 A1* | 8/2007 | Schiller | ............. G06F 17/30899 |
| | | | 715/781 |
| 2009/0222423 A1* | 9/2009 | Haruta | ................... G06F 3/0485 |
| 2009/0254807 A1* | 10/2009 | Singh | ................... G06F 17/212 |
| | | | 715/234 |
| 2012/0159393 A1* | 6/2012 | Sethi | ................. G06F 17/30554 |
| | | | 715/830 |
| 2012/0315884 A1* | 12/2012 | Forutanpour | ......... H04W 4/026 |
| | | | 455/414.2 |
| 2015/0007108 A1* | 1/2015 | Ozcelik | ................. G06F 3/0482 |
| | | | 715/810 |

FOREIGN PATENT DOCUMENTS

| | | |
|---|---|---|
| JP | 2003-30039 A | 1/2003 |
| JP | 2007-11765 A | 1/2007 |
| JP | 2009-205623 A | 9/2009 |
| WO | 2010/149398 A1 | 12/2010 |

OTHER PUBLICATIONS

Chinen, Ken'ichi, "Internet Gijutsu," Computer Software, vol. 15, No. 2, Mar. 20, 1998, pp. 48-61.

* cited by examiner

Fig.10

| USER ID | ACCESSED URL | ACCESS START DATE AND TIME | ACCESS END DATE AND TIME |
|---------|--------------|----------------------------|--------------------------|
| U001 | http://··· | 2013/01/10 13:15:00 | 2013/01/10 13:20:00 |
| U001 | http://··· | 2013/01/10 13:20:00 | 2013/01/10 13:23:30 |
| U002 | http://··· | 2013/01/05 12:40:00 | 2013/01/05 12:40:30 |
| ··· | ··· | ··· | ··· |

Fig. 11

| USER ID | ACCESSED URL | SEARCH QUERY | SEARCH DATE AND TIME |
|---|---|---|---|
| U001 | http://··· | CATEGORY = CATEGORY A | 2012/12/20 13:40:00 |
| U001 | http://··· | ¥10000≤PRICE≤¥20000 AND IN STOCK | 2012/12/26 14:00:00 |
| U002 | http://··· | CATEGORY = CATEGORY B or C | 2013/01/05 20:00:00 |
| ··· | ··· | ··· | ··· |

*Fig.12*

| USER ID | ACCESSED URL | FAVORITES LIST |
|---------|--------------|----------------|
| U001 | http://··· | PRODUCT P, PRODUCT Q |
| U001 | http://··· | HOTEL R |
| U002 | http://··· | HOTEL V, HOTEL W |
| ⋮ | ⋮ | ⋮ |

Fig.13

| USER ID | ACCESSED URL | SCROLLING RANGE | ACCESS DATE AND TIME |
|---------|--------------|-----------------|----------------------|
| U001 | http://... | 35% | 2013/02/01 10:30:00 |
| U001 | http://... | 20% | 2013/01/20 20:40:00 |
| U002 | http://... | 100% | 2013/01/15 08:40:00 |
| ... | ... | ... | ... |

*Fig.14*

| MODEL INFORMATION | RULE |
|---|---|
| MODEL A | 10% OF WHOLE WEB CONTENT |
| MODEL B | ONLY TEXT |
| ⋮ | ⋮ |

INFORMATION PROCESSING DEVICE, INFORMATION PROCESSING METHOD, INFORMATION PROCESSING PROGRAM, DISPLAY CONTROL DEVICE, AND DISPLAY CONTROL PROGRAM

CROSS REFERENCE TO RELATED APPLICATIONS

This application is a National Stage of International Application No. PCT/JP2013/055484 filed Feb. 28, 2013, the contents of all of which are incorporated herein by reference in their entirety.

TECHNICAL FIELD

One aspect of the present invention relates to an information processing device, an information processing method, an information processing program, a display control device, and a display control program, each of which controls page switching of web content.

BACKGROUND ART

In web content that is made up of a plurality of pages, page switching is done by clicking on a link to another page or a "Next" button and the like (see Patent Literature 1 below), and a page cannot be switched by scrolling. A solution to this problem is AutoPagerize function. The AutoPagerize function is a technique that generates a new page below the current page when a scroll bar moves downward and extends the track (which is also called the rail) of the scroll bar accordingly.

CITATION LIST

Patent Literature

Patent Literature 1: JP2007-11765 A

SUMMARY OF THE INVENTION

Technical Problem

However, in the case where the AutoPagerize function is used, each time moving to the next page, the processing of generating the next page and connecting it below the current page is performed, and therefore it takes time to move throughout all pages. It is thus desirable to more quickly switch the pages of web content by scrolling.

Solution to Problem

An information processing device according to one aspect of the present invention includes a receiving unit configured to receive a request for a full size frame from a user terminal, a frame generation unit configured to generate the full size frame having a size of a region occupied by a plurality of objects to be displayed on a plurality of pages arranged in a specified direction, an acquisition unit configured to acquire, from an object storage unit, all initial display objects to be embedded in an initial display page, an embedding unit configured to embed the initial display objects in the full size frame, and a transmitting unit configured to transmit the full size frame in which the initial display objects are embedded to the user terminal.

An information processing method according to one aspect of the present invention is an information processing method performed by an information processing device, the method including a receiving step of receiving a request for a full size frame from a user terminal, a frame generation step of generating the full size frame having a size of a region occupied by a plurality of objects to be displayed on a plurality of pages arranged in a specified direction, an acquisition step of acquiring, from an object storage unit, all initial display objects to be embedded in an initial display page, an embedding step of embedding the initial display objects in the full size frame, and a transmitting step of transmitting the full size frame in which the initial display objects are embedded to the user terminal.

An information processing program according to one aspect of the present invention causes a computer to implement a receiving unit configured to receive a request for a full size frame from a user terminal, a frame generation unit configured to generate the full size frame having a size of a region occupied by a plurality of objects to be displayed on a plurality of pages arranged in a specified direction, an acquisition unit configured to acquire, from an object storage unit, all initial display objects to be embedded in an initial display page, an embedding unit configured to embed the initial display objects in the full size frame, and a transmitting unit configured to transmit the full size frame in which the initial display objects are embedded to the user terminal.

According to the above aspects, because the full size frame where a plurality of pages are connected together is transmitted, the outer frame with a size of the plurality of pages is prepared from the beginning on the user terminal. Thus, unlike the AutoPagerize function according to related art, there is no need to add a page on the user terminal each time the page switching is done, and it is thereby possible to more quickly switch the pages of web content.

In an information processing device according to another aspect, the acquisition unit may acquire, from the object storage unit, waiting objects being some of a group of objects to be embedded in a page other than the initial display page, and the transmitting unit may further transmit the waiting objects to the user terminal.

In an information processing device according to another aspect, the acquisition unit may refer to an access history storage unit storing an access history to a web site from the user terminal and specify information which a user is interested in, and acquire objects related to the specified information as the waiting objects.

In an information processing device according to another aspect, the access history may include information indicating a display time of each web site on the user terminal, and the acquisition unit may specify information being the same as or similar to information shown on a web site having been displayed for a specified period of time or longer on the user terminal, and acquire objects related to the specified information as the waiting objects.

In an information processing device according to another aspect, the access history may include information indicating a search query transmitted from the user terminal, and the acquisition unit may specify information matching the search query, and acquires objects related to the specified information as the waiting objects.

In an information processing device according to another aspect, the acquisition unit may refer to an operation history storage unit storing a scrolling operation history of the user terminal on a web browser and calculate statistics of a scrolling range on the web browser, and acquire objects located in a range of the full size frame corresponding to the statistics as the waiting objects.

In an information processing device according to another aspect, the acquisition unit may acquire objects with a data size of equal to or smaller than a specified value as the waiting objects.

In an information processing device according to another aspect, the acquisition unit may acquire objects located in an acquisition range set based on capabilities of the information processing device as the waiting objects.

In an information processing device according to another aspect, the acquisition unit may refer to rule information where a model of a user terminal and an acquisition range of waiting objects are associated and specify the acquisition range corresponding to model information received from the user terminal, and acquire objects located in the acquisition range as the waiting objects.

A display control program according to one aspect of the present invention is a display control program for controlling, in the user terminal, the full size frame transmitted from the above-described information processing device, the program including a display control module configured to process the full size frame displayed on a web browser of the user terminal.

In a display control program according to another aspect, when displaying a different page by a scrolling operation, the display control module may determine whether objects in a page already displayed are to be used also in the different page, and when determining that the objects are to be used, reuse the objects at time of displaying the different page.

A display control device according to one aspect of the present invention is a display control device causing the user terminal to execute a display control program for controlling, in the user terminal, the full size frame transmitted from the above-described information processing device, wherein the display control program includes a display control module configured to process the full size frame displayed on a web browser of the user terminal.

In a display control device according to another aspect, when performing a scrolling operation to another page for which objects to be embedded are not acquired, the display control module may set a scrolling speed to be slower than an initial speed.

In a display control device according to another aspect, position information indicating a position of a specific object in the full size frame may be described, and the display control module may put a mark at a place corresponding to a display position of the specific object on a scroll bar of the web browser based on the position information.

In a display control device according to another aspect, when displaying a different page by a scrolling operation, the display control module may determine whether objects in a page already displayed are to be used also in the different page, and when determining that the objects are to be used, reuse the objects at time of displaying the different page.

Advantageous Effects of Invention

According to one aspect of the present invention, it is possible to more quickly switch the pages of web content by scrolling.

Figure 7:
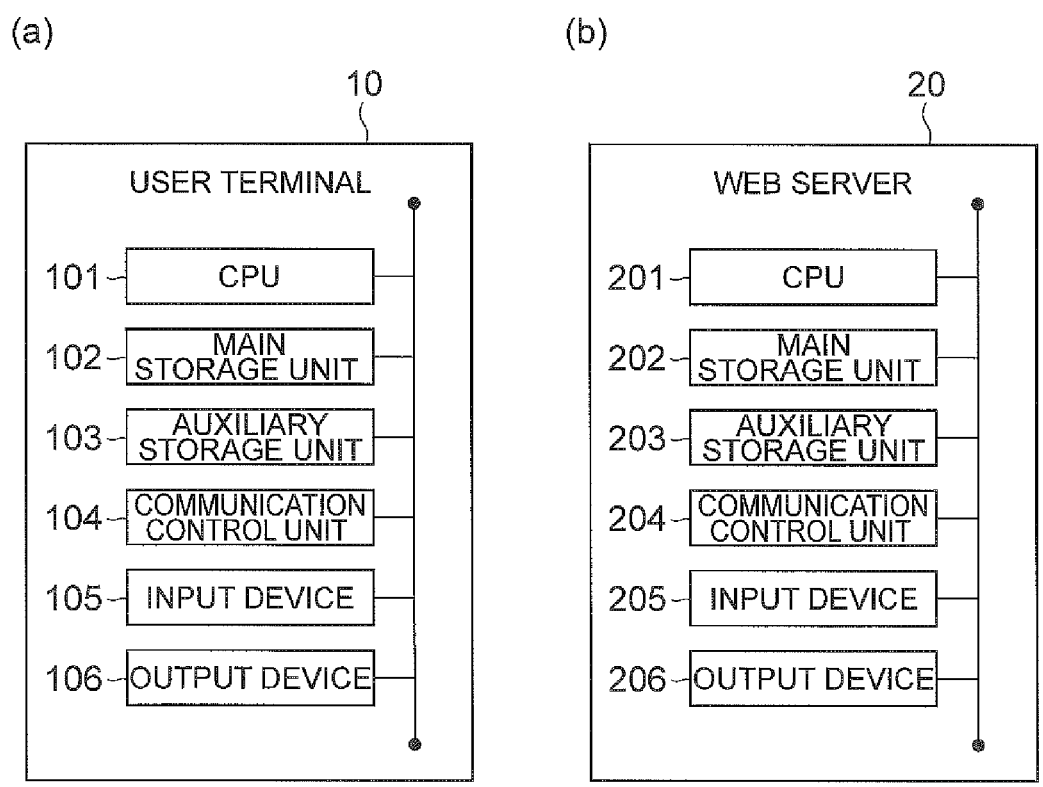

The (a) and (b) of FIG. 7 show the hardware configurations of a user terminal and a web server, respectively, according to the embodiment.

Figure 8:
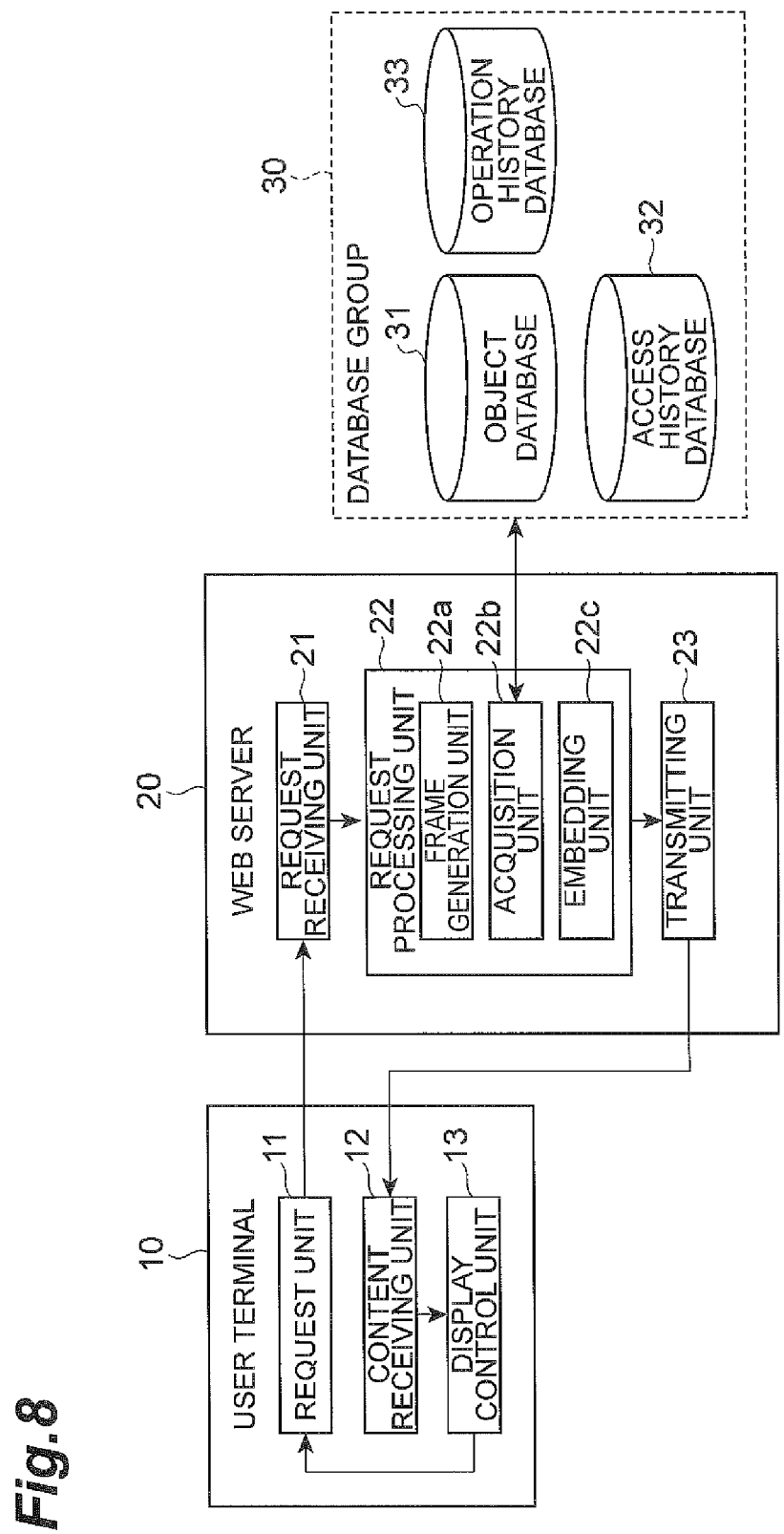
Figure 9:
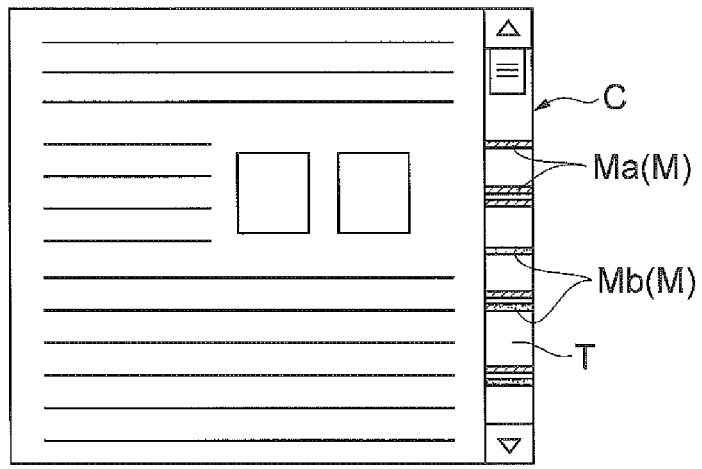

FIG. 8 is a block diagram showing the functional configurations of the user terminal and the web server according to the embodiment FIG. 9 is a view showing an example of putting a mark on a scroll bar.

FIG. 10 is a view showing an example of an access history.

FIG. 11 is a view showing an example of an access history.

FIG. 12 is a view showing an example of an access history.

FIG. 13 is a view showing an example of an operation history.

FIG. 14 is a view showing an example of rule information.

Figure 15:
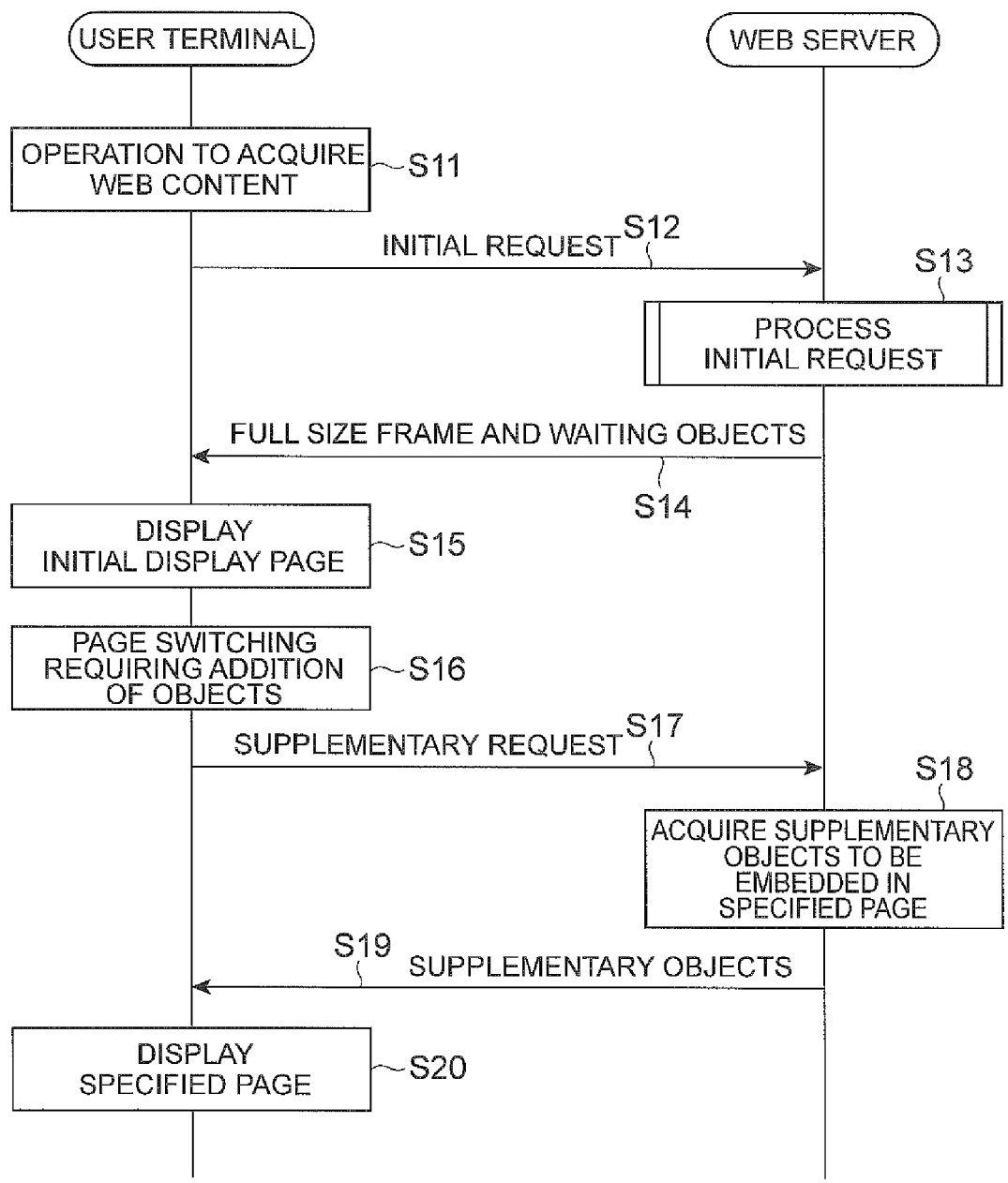

FIG. 15 is a sequence chart showing the operation of a web system according to the embodiment.

Figure 16:
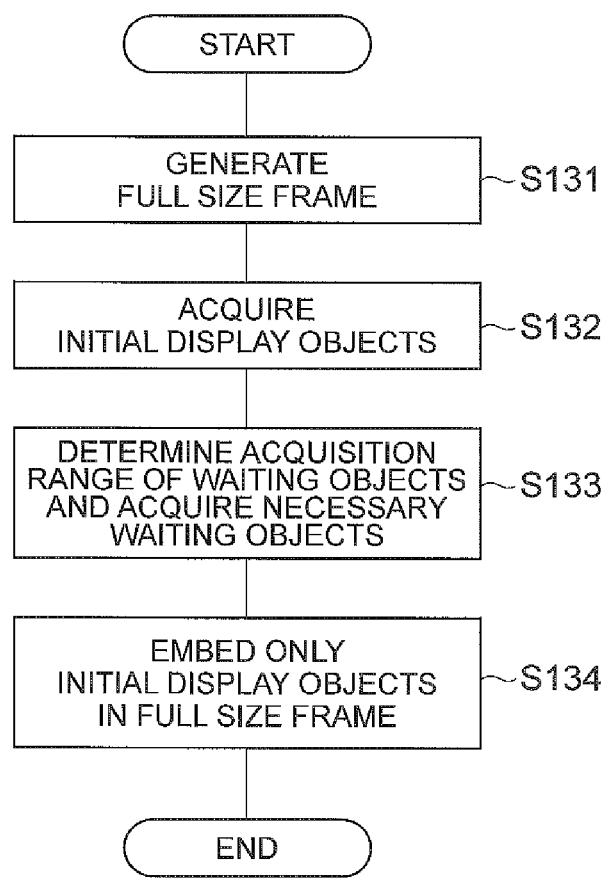

FIG. 16 is a flowchart showing the details of initial request processing in FIG. 15.

Figure 17:
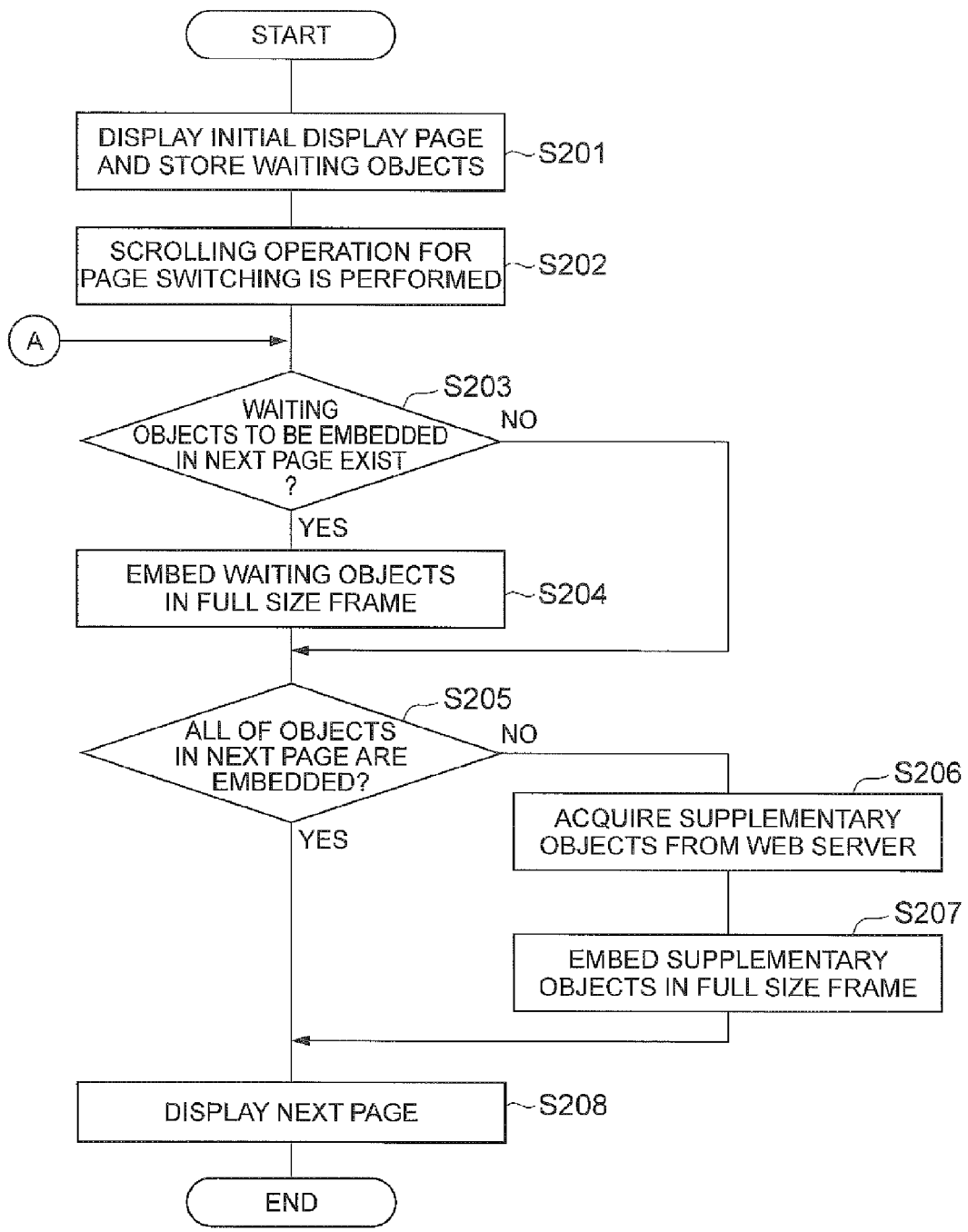

FIG. 17 is a flowchart showing the operation of a user terminal.

Figure 18:
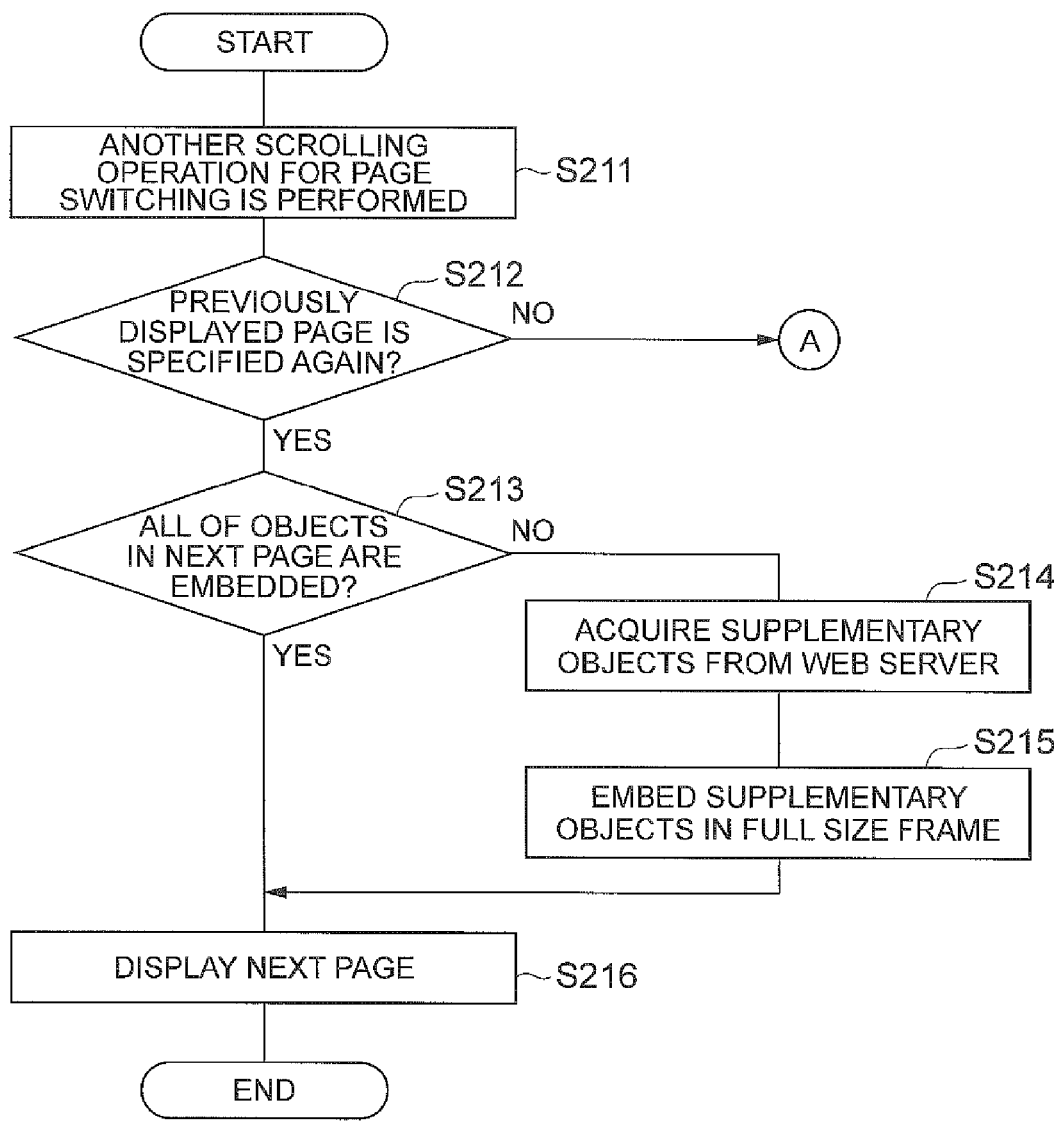

FIG. 18 is a flowchart showing the operation of a user terminal.

Figure 19:
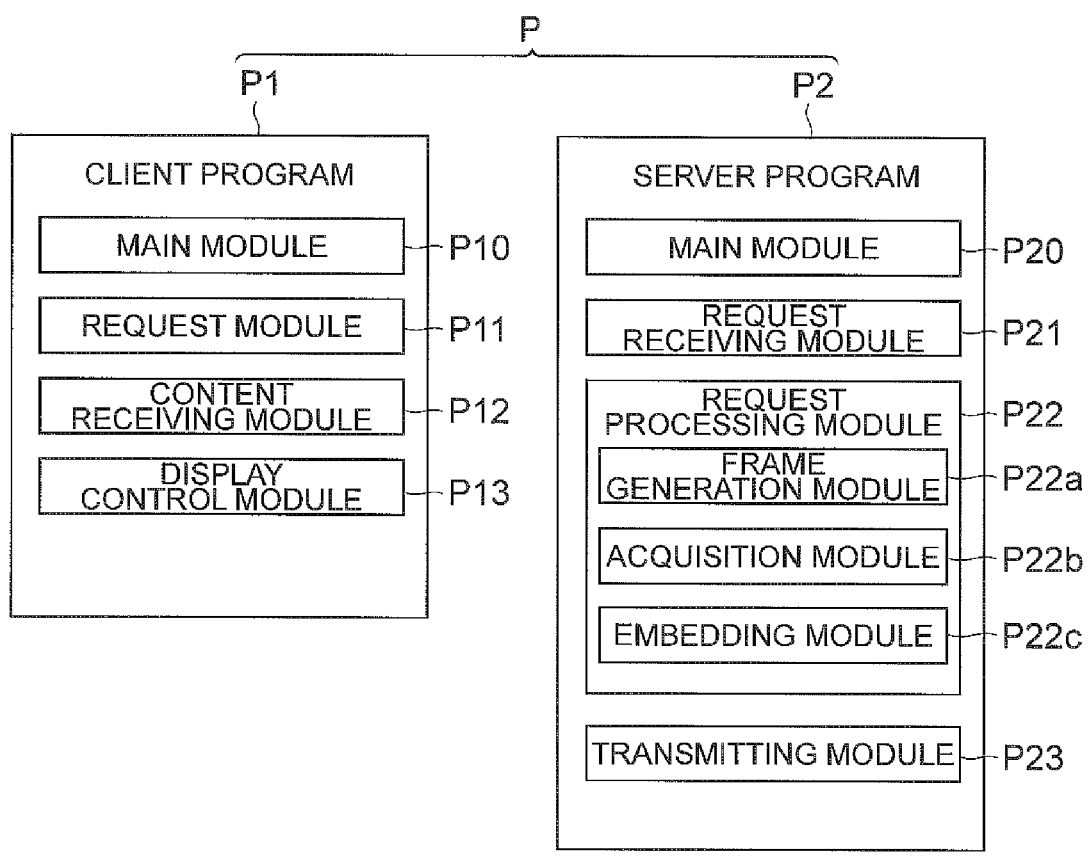

FIG. 19 is a view showing the configuration of a program according to the embodiment.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted. In the following embodiment, an information processing device according to the present invention is applied to a web server.

The functions and configuration of a web system 1 according to an embodiment are described hereinafter with reference to FIGS. 1 to 14. The web system 1 is a computer system that generates web content in response to a request from a user terminal and provides the web content to the user terminal. A user can receive various information by using the web system 1.

Figure 1:
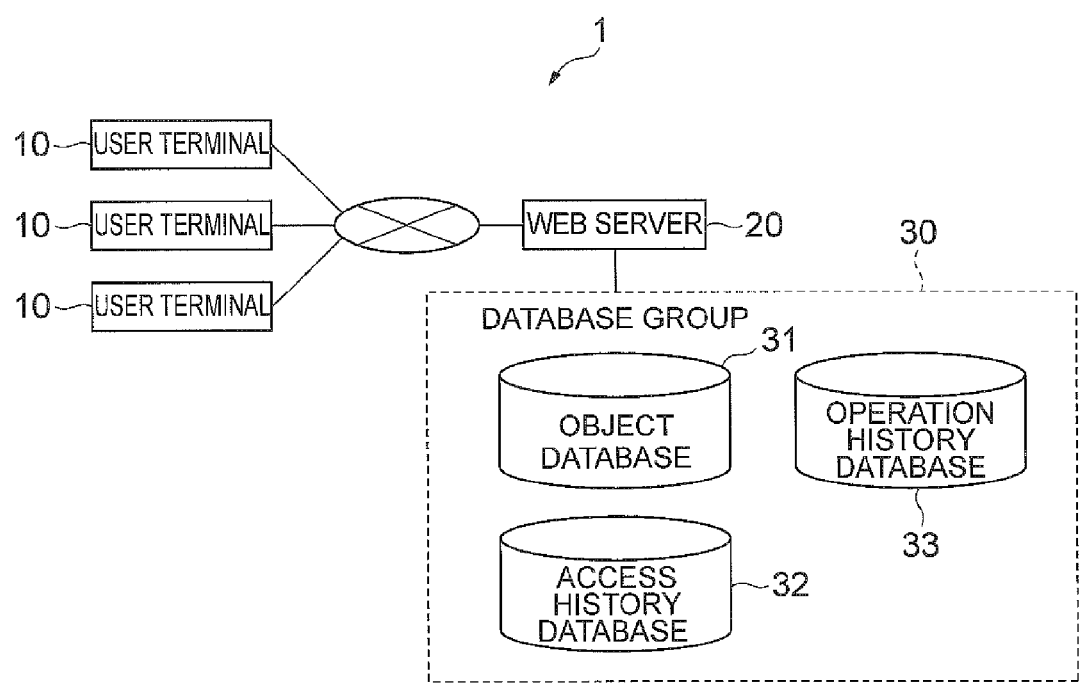
FIG. 1 is a view showing the overall configuration of a web system according to an embodiment.

As shown in FIG. 1, the web system 1 includes user terminals 10, a web server (information processing device) 20, and a database group 30. The user terminals 10 and the web server 20 are connected through a network such as the Internet. The web server 20 can access the database group 30 through a network such as the Internet or a private line. Although three user terminals 10 are shown in FIG. 1, the number of user terminals 10 is not particularly limited.

Figure 2:
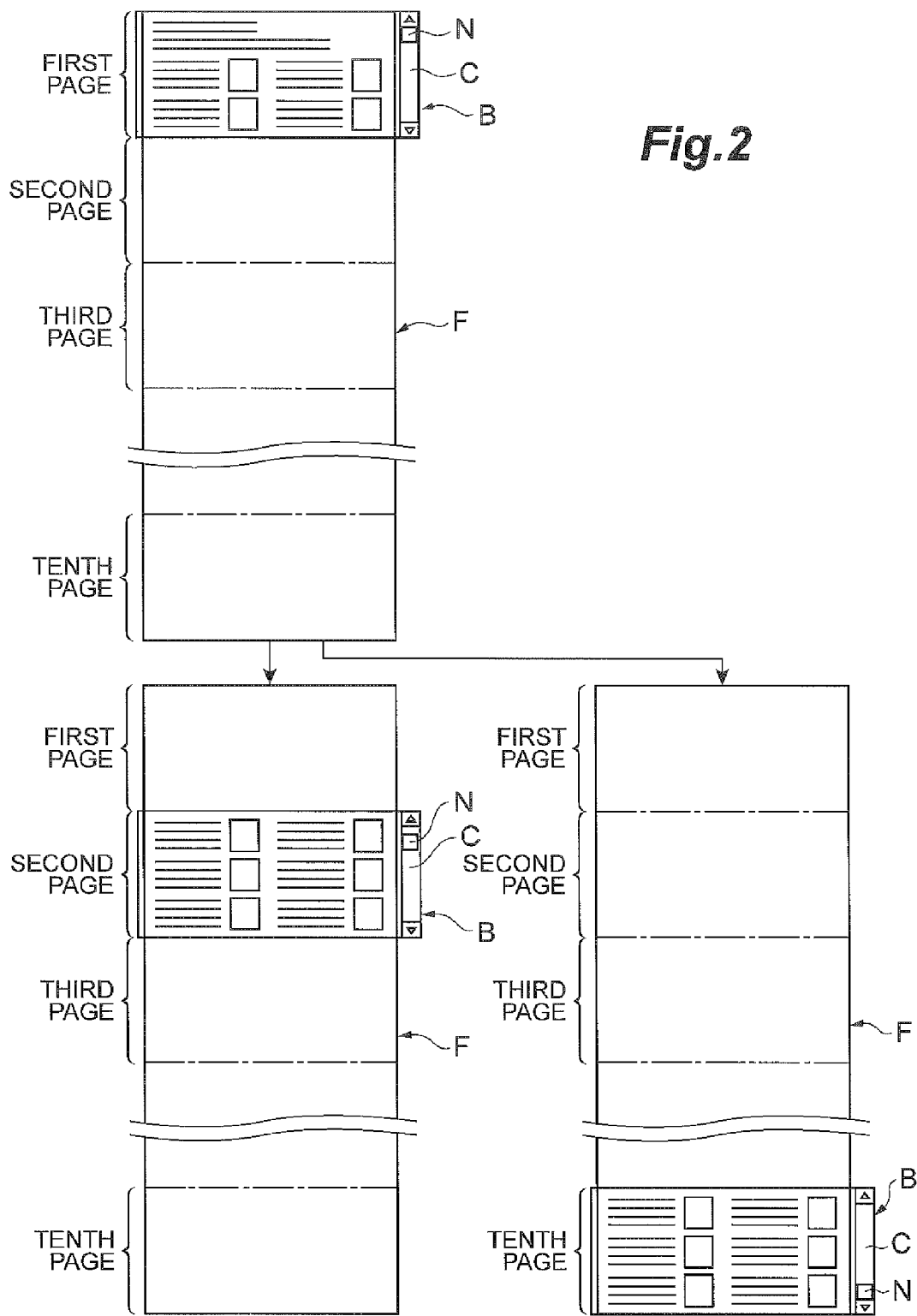
FIG. 2 is a view showing the concept of provision of web content in the embodiment.

FIG. 2 shows the concept of provision of web content in the web system 1. Web content that is provided to a user terminal in one HTTP response is made up of a plurality of pages arranged in a line. The outer frame of the web content is generated so that all of objects of the plurality of pages can be embedded, and this outer frame is referred to as "full size frame" in this specification. The type of objects is not limited, and various existing types of objects (for example, text, still images, moving images, links to another web content, banner advertisement etc.) can be embedded in the full size frame. One full size frame has the region of a plurality of pages, and the plurality of pages are sequentially connected in a line in the full size frame. In the example of FIG. 2, one full size frame F has the region of 10 pages.

Because a web browser B displays one page at a time, a user can view the web content one page by one page. In this embodiment, a button or a link to display the next page is not embedded in the web content, and a user displays another page on the web browser B by using a scroll bar C of the web browser B. Note that, as a matter of course, when the vertical or horizontal window size of the web browser is shorter than the length of the height or width of the content of one page, the scroll bar has a function of scrolling within the range of the one page. Thus, in this embodiment, the scroll bar C has two scrolling functions: the function of scrolling within the page and the function of scrolling for page switching.

The overall length of the scroll bar C (the length of a part where a knob N can move) corresponds to the overall length of the full size frame F, and the length of the knob N is set in accordance with the number of pages in the web content. In the example of FIG. 2, because the web content is made up of 10 pages, the length of the knob N is about 1/10 the overall length of the scroll bar C.

It is assumed that, when the web browser B displays the first page, a user slides the knob N of the scroll bar C down by one page or clicks on a part of the scroll bar C corresponding to the second page. In this case, the knob N moves to the position corresponding to the second page, and the web browser B displays the second page. In another example, it is assumed that a user slides the knob N of the scroll bar C down to the bottom or clicks on a plurality of times or keeps pressing down a part of the scroll bar C corresponding to the tenth page. In this case, the knob N moves to the position corresponding to the tenth page, and the web browser B displays the tenth page.

The full size frame F has the region of a plurality of pages and further has a plurality of fields for embedding each of all objects that constitute the web content. However, when the full size frame F is downloaded to the user terminal, not all of the objects are embedded in the full size frame F. The way of downloading the web content is described hereinafter with reference to FIGS. 3 to 6.

There are two types of data which the user terminal having transmitted an HTTP request receives first (data which is downloaded initially). One is the full size frame in which only all of the objects in the page that is displayed initially are embedded. In this specification, the page in the full size frame that is displayed initially on the user terminal is referred to also as "initial display page". The other one is some of the objects to be embedded in other pages that are not displayed initially, which are referred to also as "waiting objects" in this specification. The waiting objects are downloaded to the user terminal 10 independently of the full size frame without being embedded in the full size frame.

Figure 3:
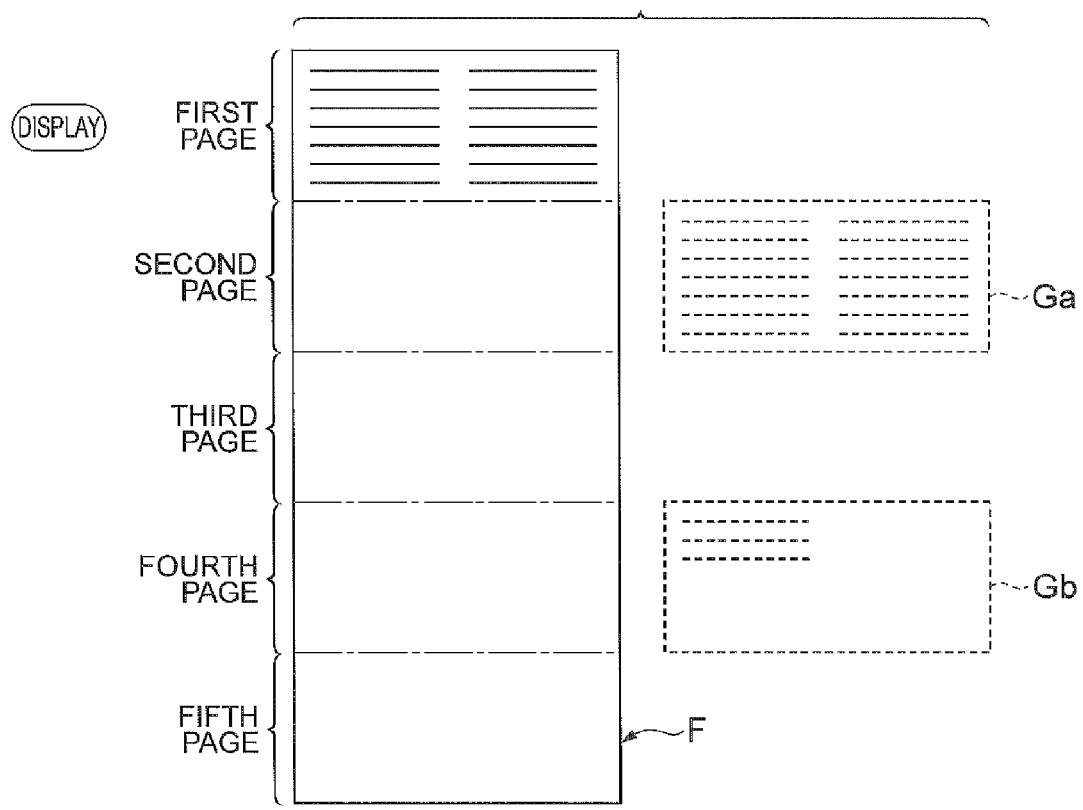
FIG. 3 is a view showing the way of downloading web content in the embodiment.

When the first page is displayed initially, the user terminal receives the full size frame F in which all of the objects of the first page are embedded as shown in FIG. 3. The user terminal further receives some of the waiting objects. The example of FIG. 3 shows that, among the objects of the second to sixth pages that are not displayed initially, all objects Ga of the objects to be embedded in the second page and some objects Gb of the objects to be embedded in the fourth page are the waiting objects. The user terminal receives the waiting objects to be embedded in the pages that are not displayed initially independently of the full size frame F.

Figure 4:
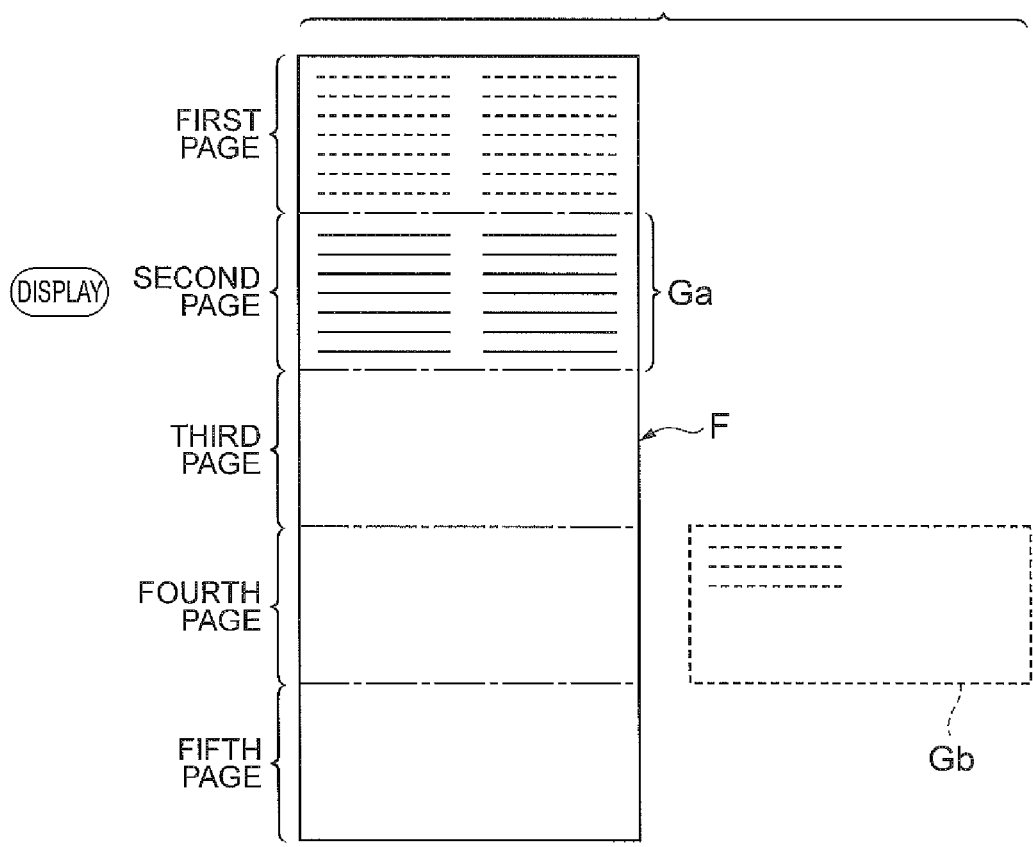
FIG. 4 is a view showing the way of downloading web content in the embodiment.

After that, it is assumed that the second page is displayed by scrolling on the web browser of the user terminal In this case, all objects Ga of the second page that have been already obtained in the initial downloading are embedded in the full size frame F and displayed as shown in FIG. 4. In this case, because the user terminal does not transmit an HTTP request to the web server, no communication occurs between the user terminal and the web server.

Figure 5:
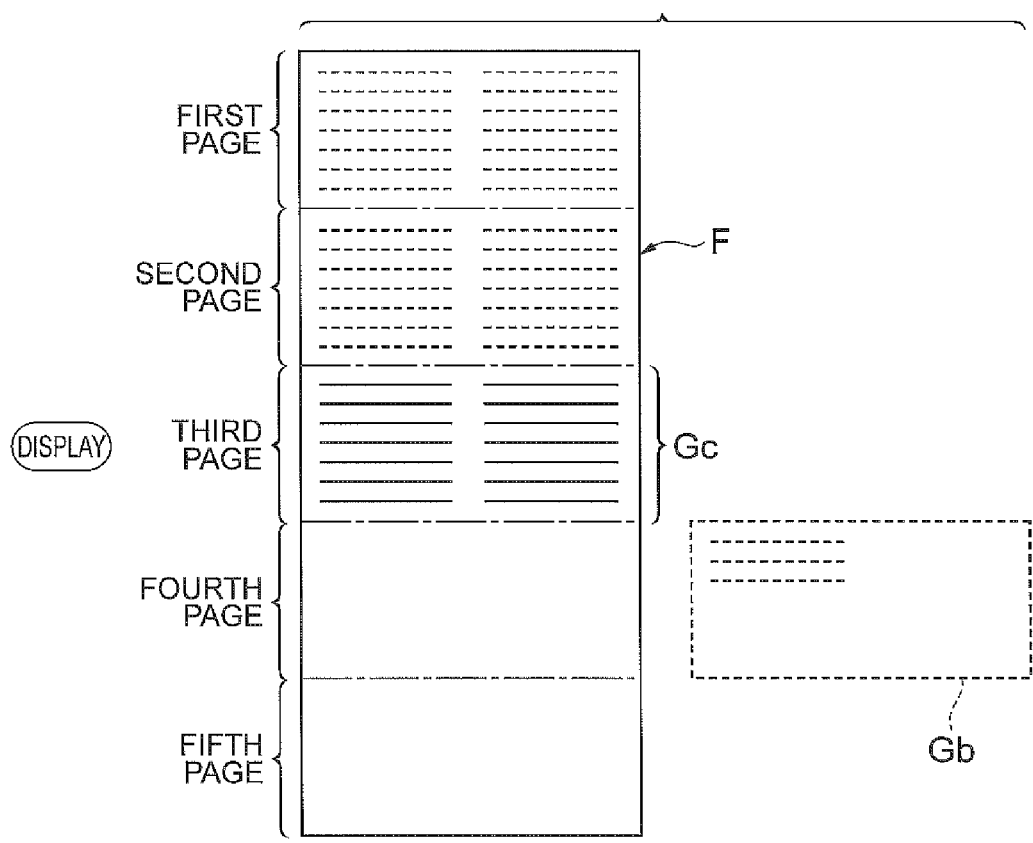
FIG. 5 is a view showing the way of downloading web content in the embodiment.

After that, it is assumed that the third page is displayed by a user's scrolling as shown in FIG. 5. Because none of objects Gc in the third page have been obtained in the initial downloading, the user terminal requests the objects Gc to the web server, receives the objects Gc of the third page transmitted in response to the request and embeds them in the full size frame F. As a result of this processing, the user can view the third page.

Figure 6:
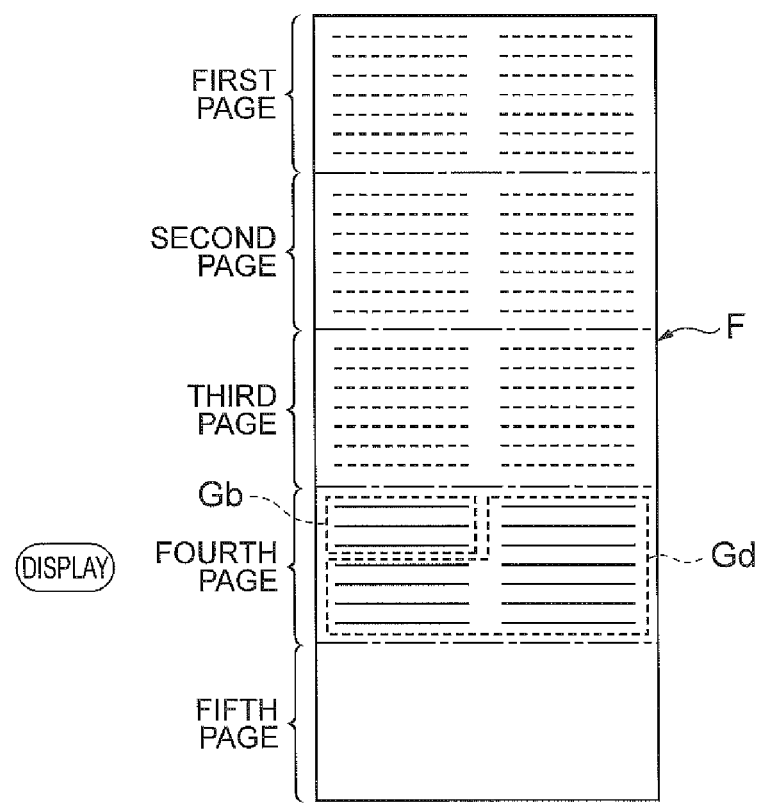
FIG. 6 is a view showing the way of downloading web content in the embodiment.

After that, it is assumed that the fourth page is displayed by the user's scrolling as shown in FIG. 6. Among the objects in the fourth page, some objects Gb that have been already obtained in the initial downloading are embedded in the full size frame F and displayed. On the other hand, among the objects in the fourth page, objects Gd that have been excluded in the initial downloading are provided from the web server for the first time at this time point, embedded in the full size frame F and displayed on the web browser.

As described above, the objects which are contained in a page that is not displayed initially and which are excluded in the initial downloading are downloaded only after they are about to be displayed by scrolling.

Hereinafter, the user terminal 10 and the web server 20 that control the full size frame are described.

As shown in (a) of FIG. 7, the user terminal 10 includes a CPU 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse or a touch panel, and an output device 106 such as a display.

The type of the user terminals 10 is not particularly limited, and it may be a stationary or portable personal computer, or a mobile terminal such as an advanced mobile phone (smart phone), a cellular phone or a personal digital assistant (PDA), for example. The parts mounted on the user terminal 10 can be different depending on the type of the terminal.

The functional elements of the user terminal 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

As shown in (b) of FIG. 7, the web server 20 has the same hardware configuration as the user terminal 10. Note that, however, specific parts that are used for hardware resources shown in FIG. 7 can be different between the web server 20 and the user terminal 10. For example, while the user terminal 10 may be provided with a touch panel as the input device 105 and the output device 106, the web server 20 may be provided with a keyboard and a mouse as an input device 205 and provided with a liquid crystal monitor as an output device 206. In the web server 20, as in the user terminal 10, the below-described functional elements are implemented using hardware.

Note that the web server 20 may be composed of one computer or may be composed of a plurality of computers.

The functions and configuration of the user terminal 10 are described hereinafter. As shown in FIG. 8, the user terminal 10 includes, as functional elements, a request unit 11, a content receiving unit 12, and a display control unit 13. Some of those functional elements are implemented when the user terminal 10 executes a script (for example, JavaScript (trademark or registered trademark)) described in the full size frame or an application programming interface (API) called from the script in the full size frame.

The request unit 11 is a functional element that requests web content to the web server 20. When a user performs an operation to request web content, the request unit 11 generates an HTTP request that contains the URL (Uniform Resource Locator) of the web content and information indicating an instruction to create a full size frame and transmits the HTTP request to the web server 20. In this specification, this HTTP request is referred to also as "initial request". Further, when data for acquiring additional objects is input from the display control unit 13, the request unit 11 generates an HTTP request based on the data and transmits the HTTP request to the web server 20. In this specification, this HTTP request is referred to also as "supplementary request".

The type of web content is not limited, and the user operation for obtaining the web content is not also limited. For example, in the case where a user accesses an online shopping site and makes product search, web content is a result of the search. Further, in the case where a user clicks on a link to a certain homepage, web content is the home page. The present invention is applicable to any web content having a plurality of pages.

The content receiving unit 12 is a functional element that receives an HTTP response transmitted from the web server 20 in response to the HTTP request. In the case of acquiring web content for the first time, the HTTP response contains the full size frame in which all objects in the initial display page are embedded and the waiting objects. In the case of acquiring missing objects in a page of the already acquired web content which is displayed for the second time or later, the HTTP response contains the lacking objects. The content receiving unit 12 outputs the received data to the display control unit 13.

The display control unit 13 is a functional element that controls the display of web content on a web browser.

When the full size frame and the waiting objects are input from the content receiving unit 12, the display control unit 13 temporarily stores the full size frame into a cache memory, and further processes the full size frame to display the initial display page on the web browser. By this processing, all objects in the initial display page embedded in the full size frame are also stored into the cache memory. Although the display control unit 13 generally displays the first page initially, it may display any one of the second and subsequent pages initially. In addition, the display control unit 13 temporarily stores the waiting objects into the cache memory.

Further, the display control unit 13 controls the display of a scroll bar. First, the display control unit 13 analyzes the full size frame and thereby specifies the total number of pages, and then adjusts the length of the knob of the scroll bar based on the total number of pages. For example, when the total number of pages is 50, the display control unit adjusts the length of the knob so that the length of the knob is 1/50 the length of the track.

Furthermore, the display control unit 13 puts a mark indicating the position of a specific object in the web content on the track of the scroll bar. For example, as shown in FIG. 9, the display control unit 13 may put a narrow crossbar as the mark on the track, or may set the color of the position on the track corresponding to the position of the object to a different color from the default color of the track. In the full size frame, position information (for example, a special tag) indicating the display position of a specific object is described. The display control unit 13 analyzes the position information and thereby specifies the rough position of the specific object in the whole web content. Then, the display control unit 13 puts a mark M on the track T of the scroll bar C corresponding to the specified position. For example, the display control unit 13 determines, that one certain specific object is located in the lower part of the fifth page and puts the mark M on the corresponding position of the track T of the scroll bar C. When there are several types of tags, the display control unit 13 may put the marks M by using different representations (for example, by using different colors) for different types. In the example of FIG. 9, two types of objects are distinguished by using different colors, and the position of each object is indicated by the mark Ma or the mark Mb.

In the case where a group of specific objects is sorted by specified criteria in the full size frame and a tag indicating a breakpoint in the sequence is described in the full size frame, the display control unit 13 may specify the position of the breakpoint in the whole web content and put a mark on the track of the scroll bar which corresponds to that position. For example, in the web content where many products with a price ranging from 10,000 yen to 100,000 yen are arranged in ascending order of the price, when a tag is given to each price range in increments of 10,000 yen, the display control unit 13 puts the marks indicating the point at which the product price changes from the 10,000 yen range to the 20,000 yen range, the point at which the product price changes from the 20,000 yen range to the 30,000 yen range, . . . , and the point at which the product price changes from the 80,000 yen range to the 90,000 yen range, on the track. Note that the sorting of objects based on certain criteria may be performed in the web server 20. Alternatively, the full size frame may be described so that the sorting can be done on the user terminal 10.

As described above, by putting marks on a track of a scroll bar, display positions of objects which a user is likely to be interested in are displayed in an easy-to-find manner, and therefore the user can quickly find the interesting object. As one example, when the marks indicate category distribution, a user can easily learn about the distribution. As another example, when the marks indicate evaluations (ranks) by users, a user can easily learn about the location of information highly evaluated by others.

The display control unit 13 may have a function of sorting objects for putting together the objects corresponding to the same mark. With use of this function, the objects corresponding to the same mark are brought together, and it is possible to display the objects in the way they are easily viewable to a user.

When a page different from the currently displayed page is designated by a user's scrolling, the display control unit 13 compares the description in the full size frame related to a page to be displayed next (next page) with the cached waiting objects and determines whether the waiting objects to be embedded in the next page exist or not. When the objects of the next page exist, the display control unit 13 reads all of the objects from the cache and embeds them in the full size frame. Further, the display control unit 13 refers to the cache and determines whether the objects that are embedded in the page displayed on the web browser before and that are reusable in the next page exist or not. When the reusable objects exist, the display control unit 13 embeds those objects in the next page.

In this manner, by reusing the objects in the page already displayed, it is possible to save the cache memory usage, reduce the amount of data communication between the user terminal 10 and the web server 20, and increase the speed of page display.

Then, the display control unit 13 determines whether all of the objects to be embedded in the next page are embedded or not. When all of the objects in the next page are embedded in the full size frame, the display control unit 13 displays the next page on the web browser without requesting additional objects. On the other hand, when not all of the objects to be embedded in the next page are cached (when there are missing objects), the display control unit 13 outputs data indicating the identifier of the full size frame, the next page number and a list of missing objects to the request unit 11. In this case, the request unit 11 generates an HTTP request (supplementary request) based on the data and transmits it to the web server 20. Then, the content receiving unit 12 receives the objects transmitted from the web server 20 in response to the request. In this specification, the objects which the user terminal 10 requests and acquires after receiving the full size frame are referred to as "supplementary objects". The display control unit 13 embeds the supplementary objects in the full size frame and thereby completes the generation of the next page, and displays that page on the web browser. Further, the display control unit 13 stores the supplementary objects embedded in the full size frame into the cache memory.

In the case of displaying again the page that has been displayed once after acquiring the full size frame, the display control unit 13 can basically display that page by reusing the objects stored in the cache memory without requesting the objects to the web server 20. However, when some objects have been erased from the cache memory due to cache control by an operating system (OS) or the like of the user terminal 10, the display control unit 13 performs the same processing as the case of acquiring the supplementary objects. Accordingly, the request unit 11 transmits a supplementary request, and the content receiving unit 12 receives the missing objects as the supplementary objects from the web server 20. The display control unit 13 embeds the acquired objects in the full size frame again.

The display control unit 13 may adjust the moving speed of a knob (scrolling speed) based on a user's scrolling. Based on the position of a knob that is moving by a user operation and information about a page where not all of the objects to be embedded are acquired, the display control unit 13 determines whether the knob is moving at the position in the track which corresponds to that page. When determining that the knob is moving on that page, the display control unit 13 sets the moving speed of the knob to be slower than the normal speed (initial speed). The normal speed is the speed that is set as the initial state of the scroll bar. After reducing the moving speed of the knob, the display control unit 13 determines whether the knob is moving at the position in the track which corresponds to the page where all of the objects are embedded. When determining that the knob is moving on that page, the display control unit 13 sets the moving speed of the knob back to the normal speed.

After the knob stops moving, the display control unit 13 displays the page corresponding to the stop position on the web browser. At this time, when the objects to be displayed on the page are missing, the display control unit 13 acquires those objects from the web server 20 as described above and embeds the acquired objects into the missing part. The acquisition of the missing objects is performed only when the movement of the knob stops.

By reducing the moving speed of the knob (intentionally making the scroll bar slower), it is possible to notify a user that the page display can be delayed by the time required for downloading the additional objects.

The display control unit 13 performs the embedding of the objects in the next page upon the stopping of movement of the knob, which is, upon the completion of a user's scrolling. Therefore, the objects are not embedded in a page that is skipped during the movement of the knob.

Note that the display control unit 13 may have an interface different from the scroll bar as a page switching means. For example, the display control unit 13 may have a function of displaying on the screen a window for directly entering a page number to go to that page. The operation after a page number is specified is the same as the operation when the knob on the scroll bar stops moving.

The full size frame may contain a script or code that enables the changing of the order of display of objects in web content by a user operation such as drag and drop. Based on the script or code, the display control unit 13 receives a user operation and changes the order of display of objects according to the operation. With this function, a user can easily perform work such as comparing information of objects.

Databases in the database group 30 that are accessed by the web server 20 are described hereinbelow. The database group 30 is a group of various databases required in the web system 1. Each of the databases may be placed in any place, and the databases may be located together in one place or located in different places. The administrator of each database may be the same or different.

An object database (object storage unit) 31 is a device that stores various types of objects that can be embedded in the full size frame. For example, the object database 31 stores various types of objects such as text, still images, moving images, links to other web content and banner advertisement. Because the type of objects is not limited, various types of databases can serve as the object database 31. For example, a product database that stores product information (information containing text such as product names and product description and product images) used in an online shopping site can serve as the object database 31. Although one object database 31 is shown in FIG. 1, the object database 31 may be a group of a plurality of types of databases.

An access history database 32 (access history storage unit) is a device that stores an access history indicating access of the user terminal 10 to a web site. A web site for which the access history is recorded is not limited. For example, when recording the access history to an online shopping site, access to the top page, each product page and the like of that site is recorded.

Both of display of a web site on the web browser of the user terminal 10 and an arbitrary operation performed by a user on the web site can be referred to as "access to the web site". Thus, the access history is not limited to the history of web sites displayed on the user terminal 10. For example, the history of search queries specified by users on a web site having a product search function, registration of favorite information on a web site and the like can also be the access history. As a matter of course, other types of information can be the access history. The function of monitoring access to a web site and recording the history may be included in each user terminal 10, the web server 20, or another server, which is not shown.

FIGS. 10 to 12 show examples of the access history. FIG. 10 shows the access history (display history) showing a display time of each web site on each user terminal 10. In this example, records where a user ID that uniquely identifies a user, URL of an accessed web site (web page), and access start date and time and end date and time are associated with one another are accumulated as the access history. Those records may include a display time in addition to or instead of the access start date and time and end date and time.

FIG. 11 shows the access history showing a search query specified and transmitted by each user terminal 10. In this example, records where a user ID, URL of an accessed web site (web page), a query for product search, and search date and time are associated with one another are accumulated as the access history.

FIG. 12 shows the access history showing a list of information registered as favorites in each user terminal 10. In this example, records where a user ID, URL of an accessed web site (web page), and the latest favorites list registered or updated are associated with one another are accumulated as the access history.

An operation history database (operation history storage unit) 33 is a device that stores a scrolling operation history in the web browser of the user terminal 10. This operation history is stored by a monitoring program that works via add-in or plug-in to the web browser. The monitoring program records the movement of the knob of the scroll bar on each web site (web page) in the user terminal 10. Each time a new web site (web page) is switched, or when the web browser is closed, the program calculates the moving range of the knob on the web page that has been displayed and transmits and stores the calculation result into the operation history database 33. The recorded moving range is the proportion of the scrolling range to the whole length of the web page. In the example of FIG. 13, records where a user ID, URL of an accessed web site (web page), a scrolling range, and access date and time are associated with one another are accumulated as the access history.

The structures of the above-described databases and records are not limited to those described above, and the databases may be normalized or made redundant by any policy. For example, the access history database 32 may store at least two types of the above-described three types of access histories.

Based on the assumption that there is the above-described database group 30, the functions and configuration of the Web server 20 are described hereinbelow. As shown in FIG. 8, the Web server 20 includes, as functional elements, a request receiving unit 21, a request processing unit 22 and a transmitting unit 23.

The request receiving unit 21 is a functional element that receives an HTTP request from the user terminal 10. The request receiving unit 21 outputs the HTTP request to the request processing unit 22. As described earlier, there are two types of the HTTP request: the initial request and the supplementary request.

The request processing unit 22 is a functional element that generates data to be transmitted back to the user terminal 10 according to the HTTP request from the user terminal 10. The request processing unit 22 includes three functional elements: a frame generation unit 22a, an acquisition unit 22b, and an embedding unit 22c. When the initial request is received, all of the three functional elements are executed, and when the supplementary request is received, only the acquisition unit 22b is executed.

Note that, even when the initial request does not contain information indicating an instruction to create the full size frame, the request processing unit 22 determines to create the full size frame in the following way. Specifically, a user stores, in advance, a user ID that uniquely identifies the user and flag information indicating whether or not to request the full size frame into a specified database. Further, it is assumed that the initial request contains a user ID. Based on such assumption, the request processing unit 22 determines to create the full size frame when the flag information corresponding to the user ID indicates a request for the full size frame.

The frame generation unit 22a is a functional element that generates a full size frame for displaying web content specified by an HTTP request.

The full size frame is made up of a region of all pages of web content. In other words, when a plurality of pages (all pages) to be displayed or possibly displayed are arranged in a specified direction, the full size frame has the size of a region occupied by a plurality of objects to be embedded in those pages and displayed on the screen.

Thus, the frame generation unit 22a needs to describe a tag (page boundary tag) indicating the boundary between pages to a file (frame file) of the full size frame. The frame generation unit 22a therefore needs to specify the total number of pages of the web content, and a method of specifying the total number of pages is not limited. For example, when web content whose total number of pages is previously determined as a fixed value is requested, the frame generation unit 22a describes the page boundary tag in the frame file according to the total number of pages. When, on the other hand, the total number of pages is not fixed such as the case of presenting a search result to a user, the frame generation unit 22a calculates the total number of pages based on the number of hits obtained in the web server 20 or another search server (not shown) and the structure of the web content determined in advance. Then, the frame generation unit 22a describes the page boundary tag in the frame file according to the calculated total number of pages.

As a matter of course, the information described in the frame file is not limited to the page boundary tag, and the frame generation unit 22a describes in the frame file another tag, data and the like required for processing by the web browser. Further, the frame generation unit 22a specifies an object to be embedded in each page and describes a tag for embedding the object in the frame file. Note that, however, no object is embedded in the full size frame at this point of time.

As described above, the frame generation unit 22a specifies the total number of pages arranged in a specified direction and all objects to be embedded in each page and displayed on the screen, and describes tags indicating each page and each object in the frame page. As a result, the full size frame having the size of the region occupied by the web content is generated.

The acquisition unit 22b is a functional element that acquires objects to be embedded in the full size frame or objects to be possibly embedded in the frame.

[Initial Request] When the initial request is received, the acquisition unit 22b acquires all objects to be embedded in the initial display page as initial display objects and acquires some of objects to be embedded in different pages from the initial display page as waiting objects. The acquisition unit 22b can acquire the initial display objects and the waiting objects from the object database 31 that stores various types of objects such as text, still images and moving images.

When acquiring the waiting objects, the acquisition unit 22b needs to determine the objects to be acquired as the waiting objects. The acquisition unit 22b can acquire the waiting objects in various ways as described below.

[Specific Page] The acquisition unit 22b may acquire all of the objects to be embedded in some pages within a specified range from the initial display page as the waiting objects. When the total number of pages of web content is ten pages and the initial display page is the first page, the acquisition unit 22b may acquire all of the objects to be embedded in the second and third pages as the waiting objects or may acquire all of the objects to be embedded in the second to fifth pages as the waiting objects. In this example, although the acquisition unit 22b may acquire all of the objects to be embedded in the second to ninth page as the waiting objects, in no case it acquires all of the objects to be embedded in the remaining nine pages.

As another example, when the total number of pages of web content is twenty pages and the initial display page is the tenth page, the acquisition unit 22b may acquire all of the objects to be embedded in the eleventh page as the waiting objects, may acquire all of the objects to be embedded in the ninth page as the waiting objects, or may acquire all of the objects to be embedded in the ninth and eleventh pages as the waiting objects. In this manner, in the case where the initial display page is a page located in the middle of the web content, the acquisition unit 22b may acquire the objects of not only the page following the initial display page but also the page previous to the initial display page as the waiting objects.

As described above, by acquiring only the objects of the page located near the initial display page, it is possible to display the nearby page on the web browser at high speed without communicating with the web server 20 again.

[Data Size or Type] The acquisition unit 22b may acquire only the objects with a data size of less than a specified threshold as the waiting objects. Note that the threshold can be set optionally according to the communication environment and the like, and it may be set to 100 KB or 1 MB, for example. Alternatively, the acquisition unit 22b may acquire only the text with a smaller data size than other objects such as images without acquiring those other objects.

As described above, by acquiring only the objects with a small data size as the waiting objects, it is possible to immediately display only the minimum information required as well as reducing the communication time and saving the usage of the cache memory.

[Device Capabilities] The acquisition unit 22b may determine the waiting objects to be acquired based on the capabilities of the Web server 20 or the user terminal 10.

In the case of determining the waiting objects to be acquired based on the capabilities of the Web server 20, the acquisition unit 22b determines which objects are to be acquired as the waiting objects based on predetermined rule information. Note that the rule information may be stored as a parameter file in a memory or may be stored in a program. For example, when the rule of acquiring the objects that correspond to 10% of the whole web content is set, the acquisition unit 22b specifies the region that corresponds to the percentage and is located within a specified range from the initial display page, and acquires the objects in the specified region as the waiting objects. When the total number of pages of web content is thirty and the initial display page is the first page, 10% of the whole web content is three pages, and therefore the acquisition unit 22b acquires the objects to be embedded in the second and third pages as the waiting objects.

Note that the two methods about "specific page" or "data size or type" described above may be defined as the rule information.

In the case of determining the waiting objects based on the capabilities of the user terminal 10, the acquisition unit 22b determines which objects are to be acquired as the waiting objects based on rule information in which the model of the terminal and the acquisition range of the waiting objects are associated.

The rule information is set in advance and stored in the Web server 20 or a specified database (not shown) in the database group 30. As shown in FIG. 14, the rule information is information in which model information (for example, model number) and a rule are associated with each other. Instead of the model, a manufacturer or a communication carrier that can be derived from the model may be associated with a rule. The use of such rule information is based on assumption that the initial request transmitted from the user terminal 10 contains information indicating the model of the terminal.

The acquisition unit 22b reads the rule information corresponding to the model information in the initial request and acquires the waiting objects based on the rule. The example of FIG. 14 shows that, when the user terminal 10 is a model A, the acquisition unit 22b acquires the objects corresponding to 10% of the whole web content as the waiting objects, and when the user terminal 10 is a model B, the acquisition unit 22b acquires only the text data in the web content as the waiting objects

[Estimation of User's Interests] The acquisition unit 22b may estimate the objects which a user is interested in and acquire the objects. For this purpose, the acquisition unit 22b refers to any one of the access history database 32 and the operation history database 33. This technique is based on the assumption that the initial request transmitted from the user terminal 10 contains a user ID that uniquely identifies a user.

[Use of Display History] When the access history database stores the display time of web pages on the user terminal 10, the acquisition unit 22b may acquire as the waiting objects the objects that are the same as or similar to those shown on a web page that has been displayed for a certain period of time or longer. To be specific, the acquisition unit 22b specifies the web page that corresponds to the user ID contained in the initial request and that has been displayed for a certain period of time or longer. Then, the acquisition unit 22b analyzes the source code of the web page and thereby specifies the objects (to be specific, text, images etc.) that have been shown on the page. The acquisition unit 22b then acquires the objects that are the same as or similar to those objects as the waiting objects. As a result, the acquisition unit 22b acquires the objects that are the same as or similar to the objects shown on the web page among the objects to be embedded in the full size frame.

The way of determining a similar object is not limited. For example, the similar object may be text that matches text in the web page indicated by the access history by a specified percentage or more (for example, 50% or more) or may be a synonym for the text in the web page. Alternatively, the similar object may be an image that is determined to be similar to an image in the web page indicated by the access history based on the existing image similarity determination using an image feature amount or the like. Alternatively, the similar object may be text or an image indicating a product that is in the same category as a product indicated by text or an image.

[Use of Search Query] When the access history database 32 stores the search history of users, the acquisition unit 22b may acquire the objects that match the search query as the waiting objects. Specifically, the acquisition unit 22b acquires one or a plurality of search queries corresponding to the user ID contained in the initial request from the access history database 32 and acquires the search query. When a plurality of search queries correspond to one user ID, the acquisition unit 22b may acquire all of the search queries or may acquire the latest one or plurality of search queries only. Then, the acquisition unit 22b acquires the objects that meet the search query as the waiting objects. For example, the acquisition unit 22b acquires information of the products (for example, product names, product description, product images etc.) that match the search query as the waiting objects. As a result, the acquisition unit 22b obtains the objects that meet the search query among the objects to be embedded in the full size frame.

[Use of Favorites] When the access history database 32 stores favorites of users registered on a specified web site, the acquisition unit 22b may acquire the objects that match information indicated by the favorites as the waiting objects. Specifically, the acquisition unit 22b acquires a list of favorites corresponding to the user ID contained in the initial request from the access history database 32. Then, the acquisition unit 22b acquires the objects that are the same as or similar to each favorites information as the waiting objects. For example, when product information (for example, information composed of a product name, product description and a product image) is registered as favorites, the acquisition unit 22b acquires the objects related to the product that is the same as or similar to that product as the waiting objects.

As described above, by using the display history, the search query or the favorites information, it is possible to acquire the objects which a user is likely to be interested in.

[Use of Operation History] The acquisition unit 22b may estimate objects which a user is interested in from the past scrolling operation and acquire the estimated objects as the waiting objects. Specifically, the acquisition unit 22b reads the operation history corresponding to the user ID contained in the initial request from the operation history database 33 and thereby specifies a scrolling range of a web page. The scrolling range of 100% indicates that a user has scrolled the web page down to the bottom, and the scrolling range of 50% indicates that a user has scrolled the web page down to the middle. Then, the acquisition unit 22b calculates the statistics of the scrolling ranges. The statistics may be the average, the median or the maximum value, though not limited thereto. The acquisition unit 22b then specifies the range of the full size frame corresponding to the statistics and acquires the objects located in that range from the object database 31.

By using the operation history as described above, it is possible to acquire the objects that are estimated to be necessary in accordance with the tendency of a user's scrolling.

Although there are various method of acquiring the waiting objects as described above, the acquisition unit 22b stores the waiting objects together with the initial display objects in any way. Note that, for one initial request, the acquisition unit 22b may acquire the waiting objects by using any two or more of the above-described acquisition methods.

[Supplementary Request] When the supplementary request is received, the acquisition unit 22b acquires all of the objects specified by the supplementary request as the supplementary objects. Specifically, the acquisition unit 22b reads the source code of the full size frame based on the identifier of the full size frame and specifies the objects to be acquired based on the next page number and a list of missing objects. Then, the acquisition unit 22b reads the specified objects from the object database 31. The acquisition unit 22b then outputs the read supplementary objects to the transmitting unit 23.

The embedding unit 22c is a functional element that embeds all of the initial display objects in the full size frame. Specifically, the embedding unit 22c writes the initial display objects or the URL of the initial display objects into the frame file. This writing is the embedding processing. The embedding unit 22c embeds only the initial display objects without embedding the waiting objects in the full size frame.

Further, the embedding unit 22c describes in the frame file position information indicating the display position of a specific object. An object to be selected as the specific object is not limited. For example, the embedding unit 22c may describe in the frame file position information indicating the position of the object which a user is likely to be interested in and which is specified based on the access history. The user terminal 10 puts a mark on the scroll bar based on the position information.

The embedding unit 22c outputs the edited full size frame (frame file) together with the waiting objects to the transmitting unit 23.

The transmitting unit 23 is a functional element that transmits the data generated or acquired by the request processing unit 22 as an HTTP response to the user terminal 10. When the HTTP request is the initial request, the transmitting unit 23 transmits both of the full size frame in which all of the initial display objects and none of the waiting object are embedded and the waiting objects to the user terminal 10. When the HTTP request is the supplementary request, the transmitting unit 23 transmits the supplementary objects to the user terminal 10.

The operation of the web system 1 is described, and further an information processing method according to this embodiment is described hereinafter with reference to FIGS. 15 to 18. Hereinafter, the case is assumed where a user makes product search on an online shopping site and 500 products are found by the search, and the search result is displayed using the full size frame. It is assumed that ten products are displayed in one page, and therefore the full size frame has a region of fifty pages.

The brief flow of the process is described hereinafter with reference to FIG. 15. When a user performs an operation to acquire web content (Step S11), the request unit 11 generates an initial request and transmits it to the Web server 20 (Step S12).

In the Web server 20, the request receiving unit 21 receives the initial request (Step S12, receiving step), and the request processing unit 22 processes the initial request and prepares a full size frame and waiting objects (Step S13), and the transmitting unit 23 transmits those data to the user terminal 10 (Step S14, transmitting step). The processing of Step S13 is described in detail later.

In the user terminal 10, the content receiving unit 12 receives the full size frame and the waiting objects (Step S14), and the display control unit 13 displays an initial display page of the full size frame (Step S15). After that, when page switching that requires addition of objects is performed by the user's scrolling operation (Step S16), the request unit 11 generates a supplementary request and transmits it to the web server 20 (Step S17).

In the web server 20, the request receiving unit receives the supplementary request (Step S17), the request processing unit 22 acquires supplementary objects to be embedded in a specified page based on the supplementary request (Step S18), and the transmitting unit 23 transmits the supplementary objects to the user terminal 10 (Step S19).

In the user terminal 10, the content receiving unit 12 receives the supplementary objects (Step S19), and the display control unit 13 embeds the supplementary objects in the full size frame and then displays the specified page (Step S20).

The processing of the initial request in the Web server 20 is described in detail with reference to FIG. 16. First, the frame generation unit 22a generates a full size frame (frame file) (Step S131, frame generation step). Next, the acquisition unit 22b acquires initial display objects (Step S132, acquisition step) and further determines an acquisition range of waiting objects and acquires the necessary waiting objects (Step S133). As described earlier, the acquisition unit 22b can determine the range of waiting objects to be acquired by various methods. After acquiring the objects, the embedding unit 22c embeds only the initial display objects in the full size frame (Step S134, embedding step).

The operation of the user terminal 10 after receiving the full size frame is described hereinafter with reference to FIGS. 17 and 18. A part of the processing described below overlaps the processing of Steps S15 to S20.

When the content receiving unit 12 receives the full size frame and the waiting objects, the display control unit 13 displays the initial display page on a web browser, and stores the waiting objects into a cache memory and thereby holds the waiting objects (Step S201). In Step S201, when necessary, the display control unit 13 performs the processing of putting a mark on a track of a scroll bar. Because the full size frame has the region of fifty pages, the length of a knob of the scroll bar is 1/50 the length of the track.

After that, when a scrolling operation for page switching is performed and the operation is completed (Step S202), the display control unit 13 performs processing for displaying the next page.

First, the display control unit 13 determines whether the waiting objects to be embedded in the next page exist in the cache memory or not (Step S203). When such waiting objects exist (YES in Step S203), the display control unit 13 reads those waiting objects from the cached memory and embeds them in the full size frame (Step S204). On the other hand, when such waiting objects do not exist (NO in Step S203), the display control unit 13 skips the processing of Step S204.

Then, the display control unit 13 determines whether all of the objects in the next page are embedded or not (Step 5205). When some of the objects in the next page are missing (NO in Step S205), the display control unit 13 acquires the supplementary objects from the web server 20 in cooperation with the request unit 11 and the content receiving unit 12 (Step S206) and embeds the supplementary objects in the full size frame (Step S207). Then, the display control unit 13 displays the next page specified by the scrolling operation on the web browser (Step S208). On the other hand, when all of the objects in the next page are embedded (YES in Step S205), the display control unit 13 displays the next page without requesting the supplementary objects (Step S208).

After that, when another scrolling operation for page switching is performed, the processing shown in FIG. 18 is carried out. When the scrolling operation is completed (Step S211), the display control unit 13 determines whether the previously displayed page is specified by the scrolling operation or not (Step S212). When it is determined that the page is to be displayed for the first time (NO in Step S212), the display control unit 13 performs the processing of Steps S203 to S208 again.

On the other hand, when the page that has been displayed once or more after receiving the full size frame is specified again (YES in Step S212), the display control unit 13 determines whether all of the objects in the next page are embedded in the full size frame or not (Step S213). The display control unit 13 determines that all of the objects in the next page are embedded in the full size frame if all of the objects in the next page are stored in the cache memory. When the objects to be displayed are missing (NO in Step S213), the display control unit 13 performs the same processing as in Steps S206 and S207 described above and then displays the next page (Steps S214 to S216). On the other hand, when all of the objects in the next page are embedded in the full size frame (YES in Step S213), the display control unit 13 displays the next page without acquiring the supplementary objects (Step S216).

If the objects of fifty pages are transmitted to the user terminal 10 all at once, when a user tries to view another page, the page is not displayed immediately and the user is forced to wait. On the other hand, according to the present invention, because only the minimum waiting objects required are transmitted to the user terminal 10 and further the embedding of the waiting objects is not performed until the time of initial display, the next page is displayed promptly.

A program P for implementing the web system 1 is described hereinafter with reference to FIG. 19. The program P includes a client program (display control program) P1 that causes a computer to function as the user terminal 10 and a server program (information processing program) P2 that causes a computer to function as the web server 20.

The client program P1 includes a main module P10, a request module P11, a content receiving module P12, and a display control module P13.

The main module P10 is a part that exercises control over the display of web content in the user terminal 10. The functions implemented by executing the request module P11, the content receiving module P12 and the display control module P13 are equal to the functions of the request unit 11, the content receiving unit 12 and the display control unit 13 described above, respectively.

The server program P2 includes a main module P20, a request receiving module P21, a request processing module P22, and a transmitting module P23. The request processing module P22 includes a frame generation module P22a, an acquisition module P22b, and an embedding module P22c.

The main module P20 is a part that exercises control over the web content management in the web server 20. The functions implemented by executing the request receiving module P21, the request processing module P22 and the transmitting module P23 are equal to the functions of the request receiving unit 21, the request processing unit 22 and the transmitting unit 23 described above, respectively. The functions implemented by executing the frame generation module P22a, the acquisition module P22b and the embedding module P22c are equal to the functions of the frame generation unit 22a, the acquisition unit 22b and the embedding unit 22c described above, respectively.

Each of the client program P1 and the server program P2 may be provided in the form of being recorded in a static manner on a tangible recording medium such as CD-ROM or DVD-ROM or semiconductor memory, for example. Further, the programs P1 and P2 may be provided as a data signal superimposed onto a carrier wave through a communication network. For example, the client program P1 may be provided in the form of being embedded in the full size frame or transmitted together with the full size frame to the user terminal 10. Note that a display control device different from the user terminal 10 may cause the client program P1 to run on the user terminal 10.

As described above, according to this embodiment, because the full size frame having a region where a plurality of pages that can be switched by scrolling are connected in a line is transmitted, the outer frame with a size of the plurality of pages is prepared from the beginning on the user terminal 10. Thus, unlike the AutoPagerize function according to related art, there is no need to add a page on the user terminal 10 each time the page switching is done, and it is thereby possible to more quickly switch the pages of web content. Further, a user can move to any page from the start only by scrolling.

Further, because some of the objects to be embedded in a page different from the initial display page are transmitted in advance to the user terminal 10, it is possible to save the time required to acquire the objects at the time of page switching. In this manner, by preparing the full size frame, which is the outer frame of all pages, from the beginning and transmitting in advance to the user terminal 10 some of the objects in the page that is not displayed initially, it is possible to more quickly switch the pages of web content by scrolling.

The user terminal 10 initially receives only the waiting objects that are estimated to be the minimum required. Further, when there are objects that are missing in the next page, the user terminal 10 requests the supplementary objects to the web server 20 for the first time at that time point. It is thereby possible to reduce the consumption of the cache memory.

An embodiment of the present invention is described in detail above. However, the present invention is not limited to the above-described embodiment. Various changes and modifications may be made to the present invention without departing from the scope of the invention.

The act of putting a mark on a scroll bar can be omitted. Further, the processing of changing the speed of a knob on a scroll bar can be also omitted.

Although the objects stored in a cache memory is reused when displaying a page that has been displayed once in the above-described embodiment, the reuse is not essential. In other words, the user terminal 10 may request the supplementary objects to the web server 20 each time a page is switched.

Although the web server 20 transmits the full size frame and the waiting objects to the user terminal 10 in response to the initial request in the above-described embodiment, the web server 20 may transmit only the full size frame in which the initial display objects are embedded to the user terminal in response to the initial request. In this case, when the next page of the initial display page is displayed, the user terminal 10 always transmits the supplementary request to the web server 20.

Further, when transmitting both of the full size frame and the waiting objects in response to the initial request, the web server 20 may transmit those two types of data to the user terminal 10 not at the same time but at different times. For example, the web server 20 may transmit the full size frame first and then transmit the waiting objects after the lapse of a specified time.

REFERENCE SIGNS LIST

1 . . . web system, 10 . . . user terminal, 11 . . . request unit, 12 . . . content receiving unit, 13 . . . display control unit, 20 . . . web server (information processing device), 21 . . . request receiving unit, 22 . . . request processing unit, 22a . . . frame generation unit, 22b . . . acquisition unit, 22c . . . embedding unit, 23 . . . transmitting unit, 30 . . . database group, 31 . . . object database (object storage unit), 32 . . . access history database (access history storage unit), 33 . . . operation history database (operation history storage unit), P1 . . . client program (display control program), P10 . . . main module, P11 . . . request module, P12 . . . content receiving module, P13 . . . display control module, P2 . . . server program (information processing program), P20 . . . main module, P21 . . . request receiving module, P22 . . . request processing module, P22a . . . frame generation module, P22b . . . acquisition module, P22c . . . embedding module, P23 . . . transmitting module

The invention claimed is:

1. An information processing device comprising:
at least one memory operable to store computer program code; and
at least one processor operable to access said program code in said memory and operate according to said program code, said program code including:
  receiving code configured to cause at least one of said at least one processor to receive a request for a full size frame from a user terminal, the full size frame being an outer frame of a web content made up of a plurality of pages arranged in a line, the pages being switchable by a scrolling operation on a web browser on the user terminal;
  frame generation code configured to cause at least one of said at least one processor to generate, in response to the request, the full size frame having a size of a region occupied by a plurality of objects to be displayed on the plurality of pages arranged in a line;
  acquisition code configured to cause at least one of said at least one processor to acquire, from an object storage, all initial display objects to be embedded in an initial display page, without acquiring all of the plurality of objects to be displayed on the plurality of pages in the full size frame, the initial display page being a page initially displayed on the user terminal among the plurality of pages;
  embedding code configured to cause at least one of said at least one processor to embed all the initial display objects in the full size frame; and
  transmitting code configured to cause at least one of said at least one processor to transmit the full size frame in which the all initial display objects are embedded to the user terminal, wherein
  the acquisition code is further configured to cause at least one of said at least one processor to acquire, from the object storage, waiting objects with a data size, measured in bytes, equal to or smaller than a specified value, the waiting objects being at least some of a group of objects to be embedded in one or more other pages located near the initial display page, the initial display page and the one or more other pages being arranged sequentially.

2. The information processing device according to claim 1, wherein
the embedding code is configured to cause at least one of said at least one processor to embed the all initial display objects in the full size frame without embedding the waiting objects in the full size frame, and
the transmitting code is configured to cause at least one of said at least one processor to further transmit to the terminal the waiting objects and the full size frame in which the all initial display objects are embedded without the waiting objects being embedded.

3. The information processing device according to claim 2, wherein
the acquisition code is configured to cause at least one of said at least one processor to refer to an access history storage configured to store an access history to a web site from the user terminal and specify information which a user is interested in, and acquire objects related to the specified information as the waiting objects.

4. The information processing device according to claim 3, wherein
the access history includes information indicating a display time of each web site on the user terminal, and
the acquisition code is configured to cause at least one of said at least one processor to specify information being the same as or similar to information shown on a web site having been displayed for a specified period of time or longer on the user terminal, and acquire objects related to the specified information as the waiting objects.

5. The information processing device according to claim 3, wherein
the access history includes information indicating a search query transmitted from the user terminal, and
the acquisition code is configured to cause at least one of said at least one processor to specify information matching the search query, and acquire objects related to the specified information as the waiting objects.

6. The information processing device according to claim 2, wherein
the acquisition code is configured to cause at least one of said at least one processor to refer to an operation history storage configured to store a scrolling operation history of the user terminal on the web browser and calculate statistics of a scrolling range on the web browser, and acquire objects located in a range of the full size frame corresponding to the statistics as the waiting objects.

7. The information processing device according to claim 2, wherein
the acquisition code is configured to cause at least one of said at least one processor to acquire objects located in an acquisition range set based on capabilities of the information processing device as the waiting objects.

8. The information processing device according to claim 2, wherein
the acquisition code is configured to cause at least one of said at least one processor to refer to rule information where a model of a user terminal and an acquisition range of waiting objects are associated and specify the acquisition range corresponding to model information received from the user terminal, and acquire objects located in the acquisition range as the waiting objects.

9. A non-transitory recording medium storing a display control program for controlling, in the user terminal, the full size frame transmitted from the information processing device according to claim 1, comprising:
display control code configured to cause at least one of said at least one processor to process the full size frame displayed on the web browser of the user terminal.

10. The non-transitory recording medium according to claim 9, wherein
when displaying a different page by the scrolling operation, the display control code determines whether objects in a page already displayed are to be used also in the different page, and when determining that the objects are to be used, reuses the objects at time of displaying the different page.

11. The information processing device according to claim 1, wherein
the acquisition code is further configured to cause at least one of said at least one processor to acquire, from the object storage, waiting objects with text that has a size equal to or smaller than a specified value.

12. The information processing device according to claim 1, wherein
the initial display objects and the waiting objects include text, still images, moving images, links to another web content, and banner advertisement.

13. A display control device causing the user terminal to execute a display control program for controlling, in the user terminal, the full size frame transmitted from the information processing device according to claim 1, wherein
the display control program comprises display control code configured to cause at least one of said at least one processor to process the full size frame displayed on the web browser of the user terminal.

14. The display control device according to claim 13, wherein
when performing a scrolling operation to another page for which objects to be embedded are not acquired, the display control code causes at least one of said at least one processor to set a scrolling speed to be slower than an initial speed.

15. The display control device according to claim 13, wherein
position information indicating a position of a specific object in the full size frame is described in the full size frame, and
the display control code causes at least one of said at least one processor to put a mark at a place corresponding to a display position of the specific object on a scroll bar of the web browser based on the position information.

16. The display control device according to claim 13, wherein
when displaying a different page by a scrolling operation, the display control code causes at least one of said at least one processor to determine whether objects in a page already displayed are to be used also in the different page, and when determining that the objects are to be used, reuses the objects at time of displaying the different page.

17. An information processing method performed by at least one computer processor in an information processing device, comprising:
receiving a request for a full size frame from a user terminal, the full size frame being an outer frame of a web content made up of a plurality of pages arranged in a line, the pages being switchable by a scrolling operation on a web browser on the user terminal;

generating, in response to the request, the full size frame having a size of a region occupied by a plurality of objects to be displayed on the plurality of pages arranged in a line;

acquiring, from an object storage, all initial display objects to be embedded in an initial display page, without acquiring all of the plurality of objects to be displayed on the plurality of pages in the full size frame, the initial display page being a page initially displayed on the user terminal among the plurality of pages;

embedding all the initial display objects in the full size frame;

transmitting the full size frame in which the all initial display objects are embedded to the user terminal; and acquiring, from the object storage, waiting objects with a data size, measured in bytes, equal to or smaller than a specified value, the waiting objects being at least some of a group of objects be embedded in one or more other pages located near the initial display page, the initial display page and the one or more other pages being arranged sequentially.

18. A non-transitory recording medium storing an information processing program causing a computer to:

receive a request for a full size frame from a user terminal, the full size frame being an outer frame of a web content made up of a plurality of pages arranged in a line, the pages being switchable by a scrolling operation on a web browser on the user terminal;

generate, in response to the request, the full size frame having a size of a region occupied by a plurality of objects to be displayed on the plurality of pages arranged in a line;

acquire, from an object storage, all initial display objects to be embedded in an initial display page, without acquiring all of the plurality of objects to be displayed on the plurality of pages in the full size frame, the initial display page being a page initially displayed on the user terminal among the plurality of pages;

embed all the initial display objects in the full size frame;

transmit the full size frame in which the all initial display objects are embedded to the user terminal; and acquire, from the object storage, waiting objects with a data size, measured in bytes, equal to or smaller than a specified value, the waiting objects being at least some of a group of objects to be embedded in one or more other pages located near the initial display page, the initial display page and the one or more other pages being arranged sequentially.

* * * * *